United States Patent [19]

Schmittner et al.

[11] Patent Number: 4,463,613
[45] Date of Patent: Aug. 7, 1984

[54] CALIBRATABLE TURBINE WHEEL GAS METER WITH EXCHANGEABLE MEASURING INSERT

[75] Inventors: Dieter Schmittner, Hofheim; Manfred Schwarz, Taunusstein, both of Fed. Rep. of Germany

[73] Assignee: Elster AG Mess- und Regeltechnik, Mainz-Kastel, Fed. Rep. of Germany

[21] Appl. No.: 406,093

[22] Filed: Aug. 6, 1982

[30] Foreign Application Priority Data

Oct. 30, 1981 [EP] European Pat. Off. ........ 81109360.8

[51] Int. Cl.³ .................. G01F 1/11; G01F 1/115; G01F 1/12
[52] U.S. Cl. ..................... 73/861.83; 73/3; 73/861.92; 73/861.93; 73/861.94
[58] Field of Search ........... 73/861.81, 861.82, 861.83, 73/861.84, 861.89, 861.91, 861.92, 861.93, 861.94, 3

[56] References Cited

U.S. PATENT DOCUMENTS

| | | | |
|---|---|---|---|
| 3,364,743 | 1/1968 | Clinton | 73/861.83 |
| 3,623,835 | 11/1971 | Boyd | |
| 3,695,106 | 10/1972 | Geisow | |
| 3,707,872 | 1/1973 | Masson | 73/861.83 |
| 3,788,142 | 1/1974 | Goransson | |

FOREIGN PATENT DOCUMENTS

| | | | |
|---|---|---|---|
| 728132 | 11/1942 | Fed. Rep. of Germany | 73/861.83 |
| 2702319 | 1/1977 | Fed. Rep. of Germany | |
| 2829866 | 7/1978 | Fed. Rep. of Germany | |
| 1288912 | 2/1961 | France | |
| 2002856 | 2/1979 | United Kingdom | |

*Primary Examiner*—S. Clement Swisher
*Attorney, Agent, or Firm*—Alan T. McCollom

[57] ABSTRACT

A calibratable turbine wheel gas meter includes a tube member having a lateral stud which carries a counter. An exchangeable measuring insert comprises an inlet member including an inlet body and an outlet member including an outlet body and is inserted into the tube member to abut a stop formed in the outlet member. Together with the tube member the inlet member forms a pressure space to measure the static pressure therein. The outlet member is formed integrally with the outlet body and is combined overlappingly with the inlet member. The inlet member and the outlet member define a passage in which the blades of a turbine wheel are located and the shaft of the turbine wheel is journalled in a bearing housing disposed in the outlet body. A pulse generator is arranged to cooperate with the turbine wheel and generates pulses, the number of which is dependent on the volume of gas passing through the passage. Each measuring insert is calibrated by comparison to a standard measuring insert. The counter is drivingly connected to the shaft of the turbine wheel by means of a transmission shaft and the counter is adapted to the respective calibrated measuring insert by exchanging the associated transmission gear.

12 Claims, 3 Drawing Figures

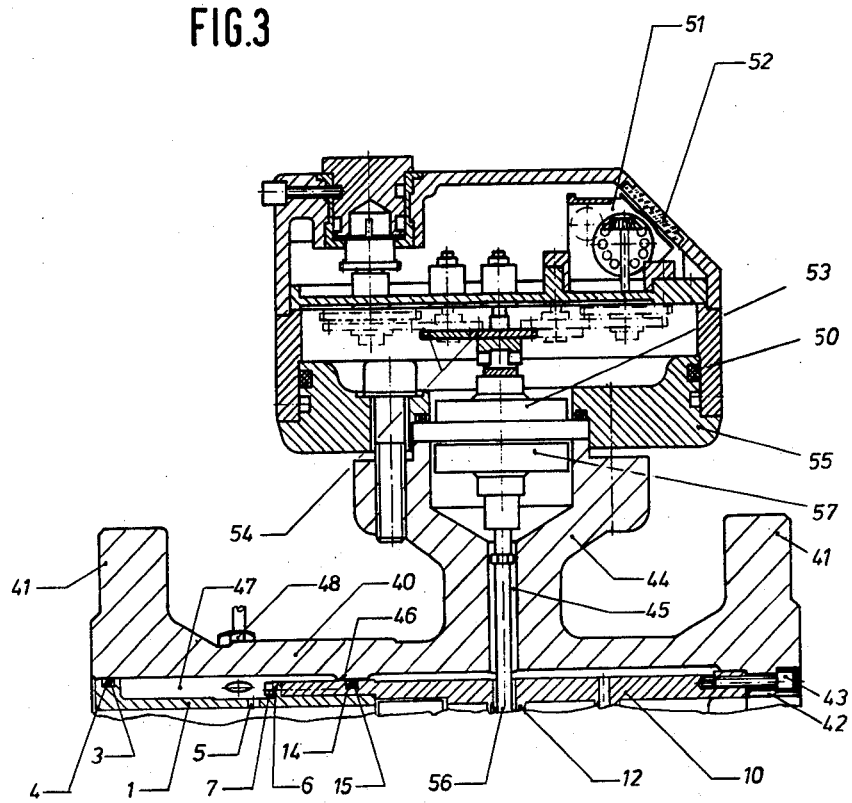

CALIBRATABLE TURBINE WHEEL GAS METER WITH EXCHANGEABLE MEASURING INSERT

BACKGROUND OF THE INVENTION

The invention relates to a turbine wheel gas meter for measuring a flow of gaseous media of the type comprising a tube member provided with connection means and having a lateral stud and a tubular measuring insert adapted to be coxially and exchangeably inserted into said tube member and having a lateral passage aligned with said lateral stud in the assembled state of said gas meter. The said measuring insert includes a bearing housing coaxially disposed in said tube member, a shaft being rotatably journalled in the end faces of said bearing housing, and a turbine wheel fixed to one end of said shaft projecting from said bearing housing, the blades of said turbine wheel being disposed in a portion of said tube member. A counter mounted on said lateral stud indicates the volume of the medium flowing through said tube member by means of a transmission shaft extending through a bore in said lateral stud and through said lateral passage of said measuring insert and being drivingly connected to said shaft of said turbine wheel.

The invention also relates to such as gas meter having an exchangeable tubular measuring insert of the above-described type.

The invention finally relates to a method for calibrating a turbine wheel gas meter of the aforementioned kind for measuring the flow of gaseous media therethrough.

PRIOR ART STATEMENT

A prior art turbine wheel gas meter (German Pat. No. 2 702 319) includes a measuring insert of the abovementioned kind which is pre-assembled and thereby easily to test. Calibration of the known turbine wheel gas meter, however, is only possible by calibrating the complete assembly on an officially approved testing stand but not at the actual location of use. The calibration is always required, if maintenance or repair of the measuring insert of the turbine wheel gas meter becomes necessary. To this end, the entire turbine wheel gas meter has to be disassembled from the respective conduit and, eventually after maintenance or repair of the measuring insert, has to be tested and calibrated on an officially approved testing stand. In general, the time required therefor was approximately 3 to 5 weeks so that a second turbine wheel gas meter has to be kept in reserve or has to be installed in a branch conduit for the time period required for calibration.

Furthermore, it is known to attach sensors cooperating with the turbine wheel in turbine wheel gas meters, either for counting the pulses caused by by the turbine wheel U.S. Pat. Nos. 3,623,835, 3,788,142) or for monitoring the turbine wheel as much (German Offenlegungsschrift No. 28 29 866).

OBJECTS OF THE INVENTION

It is one object of the invention to provide a turbine wheel gas meter of the initially mentioned kind which is adapted to be calibrated at the location of use.

It is a more specific object of the invention to provide such a meter in which the calibration of a preselected measuring insert may be confirmed at the location of use.

It is a further object of the invention to provide a turbine wheel gas meter of the initially mentioned kind such that the measuring insert thereof can be readily removed and exchanged, enabling said gas meter to become calibrated at the location of use.

It is a further object of the invention to provide a turbine wheel gas meter in which the static pressure may be precisely and reproduceably measured.

It is also an object of the invention to provide a turbine wheel gas meter of the initially mentioned kind in such a way that the transmission gear drivingly connecting the turbine wheel and the counter is readily adapted to the respectively installed measuring insert in case of exchange.

It is a final object of the invention to provide a method for calibrating a turbine wheel gas meter at the location of use in a very efficient manner requiring a minimum period of time.

STATEMENT OF THE INVENTION

The turbine wheel gas meter according to the invention comprises a pressure space in communication with an annular passage formed between a measuring insert and the tube member in which the insert resides. The pressure space is provided with a connector for measuring means to measure the static pressure in said pressure space. A pulse generator cooperates with the turbine wheel in said measuring insert, said pulse generator generating a defined number of pulses for a predetermined number of turbine wheel revolutions. A counter comprises an exchangeable transmission gear for adapting the counter to said defined number of pulses generated by the pulse generator in the respective measuring insert.

The measuring insert according to the invention is composed of an inlet member and an outlet member overlappingly connected, the overlap area being formed upstream of the turbine wheel, and includes a pulse generator cooperating with said turbine wheel and generating a defined number of pulses for a predetermined number of turbine wheel revolutions (and for a predetermined volume of gas, assuming no mechanical faults in the turbine wheel).

The method according to the invention comprises the following steps:

installing the measuring insert in a calibration system; passing a gas through said measuring insert for a pre-selected period of time at a measured flow rate, at a measured static pressures at a measured barometric pressure, and at a measured temperature; determining the associated number of pulses, evaluating the gas volume and reducing the same to standard conditions (1 bar, 0° C.);

passing a gas through a standard measuring insert for a pre-selected period of time at a measured flow rate, at a measured static pressure, at a measured barometric pressure, and at a measured temperature; determining the associated number of pulses, evaluating the gas volume and reducing the same to standard conditions (1 bar, 0° C.), determining the difference between the reduced gas volume passed through said measuring insert and the reduced gas volume passed through the standard measuring insert, and calculating the ratio of the two gas volumes, removing said measuring insert thus calibrated from the calibration system, inserting the calibrated measuring insert into the tube member and fixing the same therein, and installing said tube member in a conduit at the location of use of the turbine wheel gas meter, introducing a transmission shaft and coupling the same to the turbine wheel shaft, installing in the counter a transmission gear adapted to said ratio of said gas volumes and assembling the counter with the turbine wheel gas meter, connecting the pulse generator of said turbine wheel gas meter to an electronic counter and the pressure space in said turbine wheel gas meter to measuring means to determine the static pressure in the pressure space and subsequently calibrating said turbine wheel gas meter at the location of use by passing the respective gas therethrough and by comparing the number of pulses indicated at said electronic counter to the gas volume indicated at the counter of said turbine wheel gas meter.

In the turbine wheel gas meter according to the invention, a calibrated measuring insert is inserted into the tube member of the turbine wheel gas meter manually or, at greater nominal widths, by means of a pushing device so as to abut a stop; it is then, fixed thereto in correct position. The measuring insert comprises two components, namely an inlet member and an outlet member, the latter being formed integrally with the outlet body, so that said components can be manufactured at constant high precision with all the measuring inserts having the same throughflow characteristics. When the measuring insert is inserted into the tube member, a pressure space is formed therewith at the inlet end, said pressure space being connected to the passage so that the static pressure can be measured exactly and reproduceably without interfering with the gas flow through the passage, such being for static pressure at the location of use. The measuring insert is mounted on the tube member at the opposite end and, therefore, the fixing thereof does not affect the pressure space.

The pulse generator is rigidly connected to the measuring insert and thus, in the calibration system as well as in the turbine wheel gas meter at the location of use, supplies pulses the number of which is determined by the number of rotations of the turbine wheel. Such number is proportional to the gas volume passing through the passage, assuming no mechanical fault in the turbine wheel. The measuring insert according to the invention is calibrated on an officially approved testing stand by determining the volume of gas flowing through the passage in a pre-selected period of time and under defined conditions (pressure, temperature, flow rate) and comparing the same to the volume of gas flowing through a standard measuring insert. Excessive differences between the specimen and the standard are then compensated for by changing the transmission gear in the counter. The transmission gear is installed together with the measuring insert thus calibrated such that, at the location of use, calibration can be confirmed by comparing the number of pulses with the indication at counter.

DETAILED DESCRIPTION OF THE PREFERRED EMBODIMENT

An embodiment of the invention is illustrated in the drawings and will be described hereinbelow in greater detail with reference thereto.

FIG. 3 is a longitudinal section, partially broken away, of a turbine wheel gas meter according to the invention, including the measuring insert as shown in FIG. 1.

Figure 1:
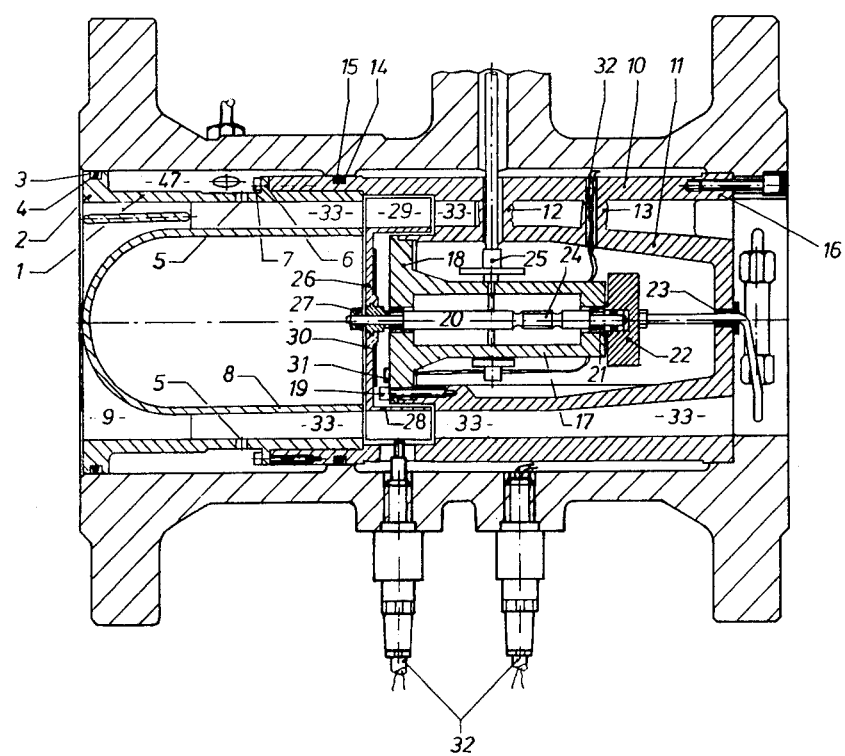
FIG. 1 is a longitudinal section of a first embodiment of the measuring insert in a turbine wheel gas meter according to the invention.

The measuring insert illustrated in longitudinal section in FIG. 1 comprises an inlet member 1 carrying at the free end thereof an outwardly projecting annular flange 2, including a recess 3 in the periphery thereof to receive a sealing ring 4. In the central portion of its length, the inlet member 1 is provided with passages 5 distributed over its periphery. An annular shoulder 6 serves to secure the inlet member 1 to the end face of an outlet member 10 described hereinbelow by means of screws 7. A cup-shaped inlet body 8 is coaxially seated in the inlet member 1 by means of radially extending ribs 9 such that the open end of the inlet body 8 faces the outlet member 10; the inlet body 8 and the inlet member 1 are of the same length. The inlet member and outlet member together are referred to herein as a housing.

The outlet member 10 and an outlet body 11 are interconnected by means of connecting webs 12,13 and are formed integrally. The outlet member 10 is stepped in two places at the end facing the inlet member 1; a first enlargement receives blades 29 of a turbine wheel 26 described further below and a second enlargement is adapted to the outer diameter of the associated end of the inlet member 1 such that both ends overlap and the end face of the outlet member 10 abuts the annular shoulder 6 of the inlet member 1. An annular groove 14 is formed in the outer wall of the outlet member 10 in the overlapping area to receive a sealing ring 15. The cup-shaped outlet body 11 extends into the range of the first enlargement; its open end faces the inlet body 8, and its closed end terminates at the end of the outlet member 10. The outlet body 11 is tapered from the region of the connecting web 12 to its closed end. The outlet member 10 is provided with a mounting flange 16 at the end remote from the inlet member 1.

A bearing housing 17 is inserted into the outlet body 11 from its open end and is secured to the end face of the outlet body 11 by means of a mounting flange 18 and screws 19. A shaft 20 extends through the bearing housing 17 and is journalled for rotation in a bearing 21 at one end of the bearing housing 17 and in the mounting flange 18 at the other end. The bearing 21 is provided with conventional axial pressure-relieving means 22, which is indicated only schematically and may operate hydraulically or may comprise a conventional thrust bearing. The pressure fluid conduit, then, extends through a plug 23 at the closed end of the bearing housing 17. Thus the rotation of the shaft 20 (and thereby the function of the turbine wheel 26) is little affected by pressure loads, particularly by pressure pulses, and becomes practically independent of the assembly position of the measuring insert. The shaft 20 is provided with a single-flight worm 24 which is engaged with a worm wheel (not shown) drivingly connected to a driven member 25 by means of a gear (not shown), said driven member 25 being mounted for rotation at the bearing housing 17 in alignment with the connecting web 12. Pick-offs of this type are known and will not have to be described in detail.

A turbine wheel is wedged to an end of the shaft 20 projecting from the mounting flange 18 and secured by means of nuts 27. The turbine wheel 26 forms a skirt 28 extending back towards the outlet body 11 and overlapping the same over a short portion of its length, the outer diameter of the skirt 28 being adapted to the outer diameter of the inlet body 8 and having blades 29 projecting therefrom and received in the first enlargement in the outlet member 10. A mark carrier 30 is attached to the surface of the turbine wheel 26 facing the mounting flange 18 and is provided with radially extending marks disposed at equal angular distances and cooperating with a pulse generator 31 inserted into the mounting flange 18 (see, for example, German Offenlegungsschrift No. 28 29 866.0). Signals generated by the pulse generator 31 are conducted by lines 32 led to the outside through a bore in the connecting web 13.

Figure 2:
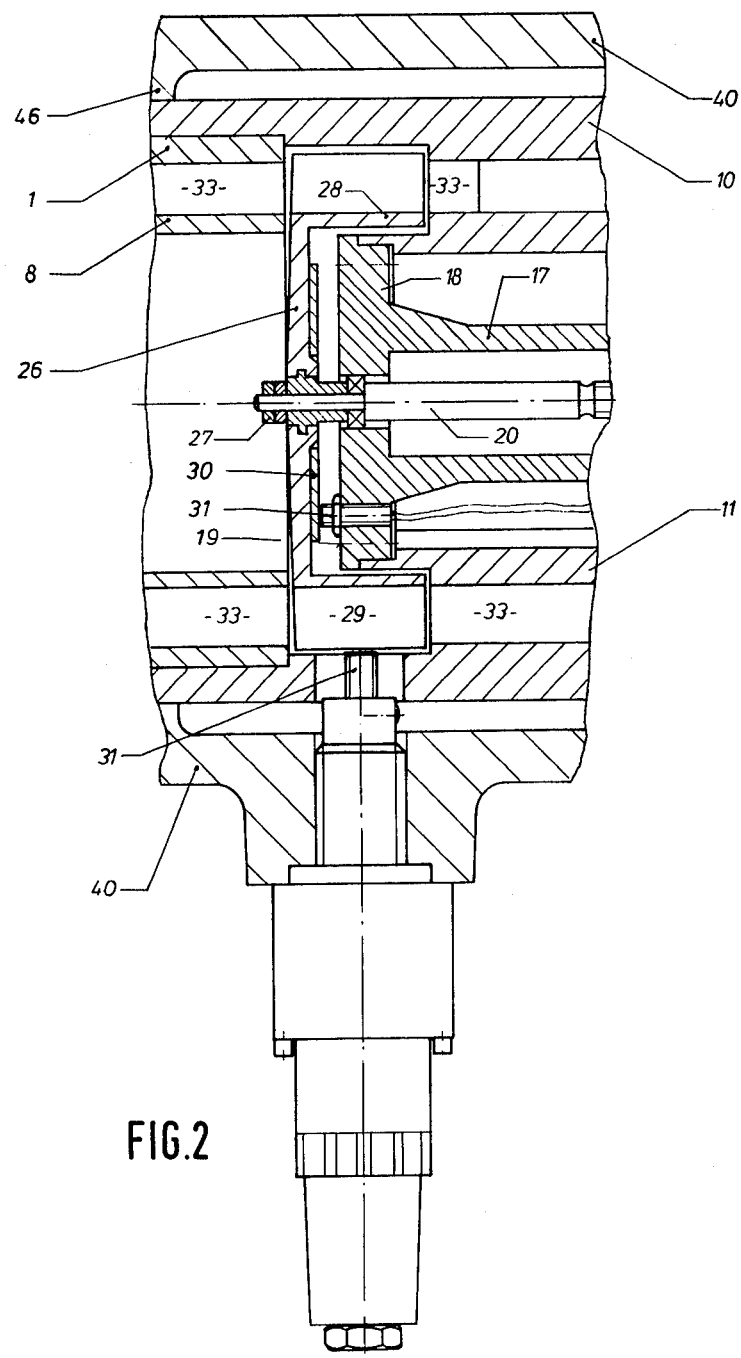
FIG. 2 is part of a longitudinal section of a modified design of the measuring insert as shown in FIG. 1

In the partial section of FIG. 2 there is shown a modified design of the measuring insert described above; identical components therein have the same reference numerals. The inlet member 1, the outlet member 10, the outlet body 11 with the bearing housing 17 and the turbine wheel 26 with the blades 29 projecting from the skirt 28 are recognized in FIG. 2. In this design, the pulse generator 31 is inserted into the wall of the outlet member 10 in the range of the first enlargement such that the pulse generator 31 does not interact with a mark carrier 30 mounted to the turbine wheel 26 but immediately with the blades 29.

In the measuring insert illustrated in FIGS. 1 and 2, a passage 33 is formed between the inner wall of the inlet member 1 and the inner wall of the outlet member 10, on the one hand, and the inlet body 8 and the outlet body 11, on the other hand, into which passage the blades 29 of the turbine wheel 26 extend and which is defined by the skirt 28 of the turbine wheel 26 in the range between the inlet body 8 and the outlet body 11. Pressure losses from the measuring insert are minimized in this way due to the design of the passage 33 and to the outlet enlargement caused by the tapering of the outlet body 11.

FIG. 3 shows a turbine wheel gas meter with the measuring insert described in FIG. 1 installed. Identical components therein have the same reference numerals. The measuring insert is placed into a tube member 40 of the turbine wheel gas meter, which tube member is provided with connecting flanges 41 at both ends and with a stop 42 in the form of an inwardly projecting ring at the outlet end thereof. The measuring insert is inserted into the tube member 40 to abut the stop 42 and is fixed thereto by means of screws 43. It is then positioned such that a lateral stud 44 with a bore 45 at the tube member 40 is aligned to a lateral passage in the measuring insert, said passage being formed by aligned bores in the outlet member 10, in the connecting web 12, in the outlet body 11 and in the bearing housing 17. The sealing ring 15 then engages an annular shoulder 46 projecting from the tube member 40 towards the measuring insert, whereas the sealing ring 4 engages the inner wall of the tube member 40 at the inlet end thereof. In this way, a pressure space 47 between the measuring insert and the tube member 40 is formed axially defined and sealed by the sealing rings 4,15. The pressure space 47 is connected to pressure measuring means through a connector 48 and to the passage 33 through the passages 5 in the inlet member 1 and is used for measuring the static gas pressure in the conduit in which the turbine wheel gas meter is installed.

The lateral stud 44 carries a counter housing 50 having a counter 51 and a viewing window 52; the counter housing 50 also receives an exchangeable transmission gear 54 interconnected between the counter 51 and the driven member 53 of a magnetic clutch. The counter housing 50 is sealingly screwed to the lateral stud 44 by means of a counter head 55. A transmission shaft 56 extends through the bore 45 of the lateral stud 44, one end of which is coupled to the driven member 25 at the bearing housing 17 and the other end of which is coupled to the driving member 57 of the magnetic clutch. Thereby, a driving connection is established between the counter 51 and the shaft 20 of the turbine wheel 26, said driving connection being adapted to the respective measuring insert and indicating the flow of a defined gas volume through the passage 33 in accordance with a defined number of pulses generated by the same gas flow at the pulse generator 31. The calibration of the turbine wheel gas meter is thus reduced to the calibration of the measuring insert.

The measuring insert is calibrated on an officially approved testing stand. To this end, the measuring insert is placed into a corresponding tube member provided with a counter. An air flow of known rate Q ($m^3/h$) is passed through the specimen for a pre-selected period of time t (s), the static pressure P (mbar) is measured at the connector 48, the barometric pressure b (mbar) and the air temperature (°C.) are taken; the volume $V_P$ of the air flown through is measured by the indication at the counter and the number of pulses I occurring at the pulse generator is determined. The volume $V_P$ thus found is reduced to standard conditions (1 bar, 0° C.) and compared to the volume $V_N$ correspondingly found using a standard measuring insert after reduction to standard conditions. If differences from the standard occur, a transmission gear 54 corresponding to the difference is selected to compensate for the deviation in the counter indication with the measuring insert placed on the test stand from the standard, which transmission gear 54, when installed in an alike counter 51 assembled with the measuring insert tested, will yield the same volume indication as obtained with the standard. A calibration certificate is then prepared showing inter alia the number of pulses per $m^3$ and to which the abovementioned transmission gear 54 is added.

If, for example, a turbine wheel gas meter breaks down due to a defect in the measuring insert, first the counter head 55 (and thereby the counter housing 50, the counter 51, the transmission gear 54 present and the driven member 53) are disassembled from the tube member 40. Then the driving member 57 of the magnetic clutch and the transmission shaft 56 are disassembled. After removing the tube member 40 from the gas conduit (not shown) on which the meter is installed, the screws 43 are unscrewed and the measuring insert is removed from the tube member 40, if necessary, by means of an ejection tool. Subsequently, the measuring insert calibrated as above is, by means of a pushing tool if necessary, pushed into the tube member 40 to abut the stop 42 and then fixed to it by means of the screws 43. The tube member 40 with the calibrated measuring insert is installed in the conduit, the transmission shaft 56 is connected with the driven member 25 at the bearing housing 17, and the driving member 57 of the magnetic clutch is re-attached to the transmission shaft 56. After removing the counter housing 50, the transmission gear 54 present in the counter 51 is exchanged for the transmission gear supplied with the calibrated measuring insert, the counter housing 50 is closed again and the counter head 55 is re-attached to the lateral stud 44. In this way, the turbine wheel gas meter is ready for work again; it is re-calibrated by connecting the lines 32 to an electronic counter and counting the number of pulses after passage of 1 m³ which will conform with the number of pulses per m³ determined in the calibration.

EXAMPLE

A measuring insert forming the test specimen and designed for a nominal width of DN 80 is placed in the calibration system. Air is flown therethrough for 28.4 sec at a flow rate of 158.1 m³/h; the static pressure is 972.2 mbar, barometric pressure is 1008.5 mbar, temperature t is 21.2° C., and the number of pulses is I=60000.

Calculated air volume: $V_P = 1.247$ m³

Reduced air volume: $V_{P,red} = 1.112$ m³.

Air is passed through a standard insert for 28.4 sec at a flow rate of 157.4 m³; the static pressure is 973.5 mbar; barometric pressure is 1008.5 mbar, temperature t is 21.3° C., and the number of pulses is I=12354.

Calculated air volume: $V_N = 1.242$ m

Reduced air volume: $V_{N,red} = 1.109$ m³.

The reduction is according to the formula $$V_{red} = V \frac{P \cdot 273.16}{1013 (273.16 + t)}.$$

The counter used for this measuring insert has the appropriate transmission to the turbine wheel shaft and includes a counter gear set and an exchangeable transmission gear selected from an adjusting gear set. The adjusting gear set for the measuring insert comprises two gears having 35 and 44 teeth, respectively. On exchanging an appropriately sized adjusting gear for the transmission gear installed in the counter, the entire transmission between turbine wheel shaft and the counter indication will be changed by the factor $$\frac{V_{N,red}}{V_{P,red}},$$

whereby the counter indication is adjusted to the respective measuring insert. The instrument factor $C_P = I/m^3$ for the test specimen of the example is 48099.4.

We claim:

1. In a turbine wheel gas meter for measuring the flow therethrough of a gaseous medium of the type having, a tube member having a lateral stud and provided with means for connecting said tube member to a gas conduit, a tubular measuring insert adapted to be inserted coaxially and exchangeably into said tube member, said insert comprising a cylindrical housing member, a lateral passage for registration with said lateral stud when said insert is so inserted, an inlet body disposed coaxially within said housing member, an outlet body disposed coaxially within said housing member downstream from said inlet body, said outlet body defining an annular flow passage together with said inlet body and with the interior wall of said housing member and being connected rigidly to said housing member by means of connecting webs, including a bearing housing disposed coaxially within said outlet body and having end faces in which a shaft is journalled rotatably, and including a turbine wheel fixed to one end of said shaft projecting from the end face of said bearing housing which faces said inlet body, the blades of said turbine wheel being disposed in a portion of said flow passage formed intermediate said inlet body and said outlet body; and counting means mounted on said lateral stud for indicating the volume of gas which has passed through said flow passage, said counting means being coupled by a clutch to a transmission shaft which extends through a bore in said lateral stud and through said lateral passage of said measuring insert and which is drivingly connected to said shaft of said turbine wheel;
   a pressure space in communication with said flow passage when said insert is so inserted;
   means for measuring the pressure in said space;
   a pulse generator included in said measuring insert and cooperating with said turbine wheel for generating a defined number of pulses corresponding to a repdetermined number of turbine wheel revolutions; and
   an exchangeable transmission gear in said counting means for relating such an indicated volume of such generated pulses.

2. The turbine wheel gas meter of claim 1 wherein said pressure space forms an annular space between the interior wall of the tube member and the exterior wall of said measuring insert, said annular space being sealed at its ends.

3. The turbine wheel gas meter of claim 2 wherein said pressure space is defined by longitudinally spaced annular shoulders extending between said measuring insert and the interior wall of the tube member and wherein said meter further includes means for sealing said shoulders between said insert and side wall.

4. The turbine wheel gas meter of claim 3 which further includes means for mounting the measuring insert and wherein said mounting means are formed at opposite ends of the tube member.

5. The turbine wheel gas meter of claim 4 wherein said means for mounting the measuring insert include screws which are threadably received in an upwardly projecting stop formed at the outlet end of the tube member.

6. The turbine wheel gas meter of claim 1 wherein said measuring insert includes an inlet member and an outlet member, said inlet member and said outlet member being interconnected overlappingly with the overlap region being formed downstream from said turbine wheel.

7. The turbine wheel gas meter of claim 6 wherein said outlet member is formed integrally with said outlet body.

8. The turbine wheel gas meter of claim 1 wherein said measuring insert comprises an inlet member and an outlet member, said inlet member and said outlet member being interconnected overlappingly with the overlap region being formed downstream from the turbine wheel and wherein said meter further includes a pair of spaced apart sealing rings mounted on the radially outer surface of said insert, and a plurality of bores formed in said inlet member between said sealing rings.

9. The turbine wheel gas meter of claim 1 wherein a mark carrier is mounted on said turbine wheel facing said bearing housing, said pulse generator being oriented toward said mark carrier.

10. The turbine wheel gas meter of claim 1 wherein said measuring insert includes an inlet member and an outlet member, said inlet member and said outlet member being interconnected overlappingly with the overlap region being formed downstream from said turbine wheel and wherein said pulse generator is received within a bore formed in said outlet member adjacent said turbine wheel.

11. In a turbine wheel gas meter for measuring the flow therethrough of a gaseous medium of the type having, a tube member having a lateral stud and provided with means for connecting said tube member to a gas conduit, a tubular measuring insert adapted to be inserted coaxially and exchangeably into said tube member, said insert comprising a lateral passage for registration with said lateral stud when said insert is so inserted, an inlet body disposed coaxially within said outer member, an outlet body disposed coaxially within said outer member downstream from said inlet body, said outlet body defining an annular flow passage together with said inlet body and with the interior wall of said outer member and being connected rigidly to said outer member by means of connecting webs, including a bearing housing disposed coaxially within said outlet body and having end faces in which a shaft is journalled rotatably, and including a turbine wheel fixed to one end of said shaft projecting from the end face of said bearing housing which faces said inlet body, the blades of said turbine wheel being disposed in a portion of said flow passage formed intermediate said inlet body and said outlet body; and counting means mounted on said lateral stud for indicating the volume of gas which has passed through said flow passage, said counting means being coupled by a clutch to a transmission shaft which extends through a bore in said lateral stud and through said lateral passage of said measuring insert and which is drivingly connected to said shaft of said turbine wheel, said method involving the steps of:

installing the measuring insert in a calibration system, passing a gas through said measuring insert for a preselected period of time and at a measured flow rate, at a measured static and at a measured barometric pressure and at a measured temperature, determining the associated number of pulses and evaluating the gas volume and reducing the same to standard conditions (1 bar, 0° C.);

passing a gas through a standard insert for a preselected period of time and at a measured flow rate, at a measured static and at a measured barometric pressure and at a measured temperature, determining the associated number of pulses and evaluating the gas volume and reducing the same to standard conditions (1 bar, 0° C.);

determining the difference between the evaluated and reduced gas volume passed through said measuring insert and the evaluated and reduced gas volume passed through said standard insert, and calculating the ratio of the two gas volumes;

removing said measuring insert thus calibrated from the calibration system, inserting the calibrated measuring insert into the tube member and fixing the same therein, and installing said tube member in the conduit at the location of use of the turbine wheel gas meter;

introducing the transmission shaft and coupling the same to the turbine wheel shaft; and installing in the counter a transmission gear adapted to said ratio of said gas volumes and assembling the counter with the turbine wheel gas meter, connecting the pulse generator of said turbine wheel gas meter to an electronic counter and the pressure space in said turbine wheel gas meter to measuring means to determine the static pressure in the pressure space and subsequently confirming calibration of said turbine wheel gas meter at the location of use by passing the respective gas therethrough and by comparing the number of pulses indicated at said electronic counter to the gas volume indicated at the counter of said turbine wheel gas meter.

12. An exchangeable tubular measuring insert for a turbine wheel gas meter for measuring the throughflow of gaseous media, said measuring insert including:

a lateral passage;

an inlet body;

an outlet body coaxially aligned with said inlet body downstream therefrom;

a bearing housing disposed coaxially within said outlet body and having end faces within said outlet body in which a shaft is journalled rotatably; and a turbine wheel fixed to one end of said shaft projecting from that end of said bearing housing which faces said inlet body, the improvement wherein comprises:

an inlet member and an outlet member inter connected overlappingly, the overlap region being located upstream from said turbine wheel;

an annular flange including a circumferential groove and a sealing ring received therein and an annular groove receiving a sealing ring provided at the input end of the inlet member and in the overlap region, respectively; and passage distributed over the circumference of a central portion of the length of said inlet member intermediate said sealing rings; and a pulse generator cooperating with said turbine wheel to generate a defined number of pulses corresponding to a predetermined volume of gas which has flown through said member.

* * * * *

UNITED STATES PATENT AND TRADEMARK OFFICE
CERTIFICATE OF CORRECTION

PATENT NO. : 4,463,613

DATED : August 7, 1984

INVENTOR(S) : Schmittner et al

It is certified that error appears in the above-identified patent and that said Letters Patent is hereby corrected as shown below:

Column 2, line 48, "s" should read -- , --.
Column 4, line 21, after "housing" insert -- member --.
Column 7, line 23, after "m" insert -- 3 --.

Signed and Sealed this

Eighteenth Day of December 1984

[SEAL]

Attest:

GERALD J. MOSSINGHOFF

Attesting Officer

Commissioner of Patents and Trademarks